United States Patent [19]

Apetrei et al.

[11] Patent Number: 4,589,534

[45] Date of Patent: May 20, 1986

[54] ELECTROMECHANICAL DRIVING SYSTEM WITH VARIABLE SPEED

[75] Inventors: Constantin Apetrei; Sigismund Slaifer; Laurentiu Vatafu-Gaitan; Dumitru Stefanescu; Stelian Marinescu; Marin Catana, all of Bucharest, Romania

[73] Assignee: Institutal de Cercetare Stintifica si Inginerie Technologica Pentrj Industria Electrotehnica, Bucharest, Romania

[21] Appl. No.: 463,830

[22] Filed: Feb. 4, 1983

[51] Int. Cl.[4] .................. F16D 67/06; H02K 7/112
[52] U.S. Cl. ............................ 192/18 B; 192/90; 192/113 A; 310/76
[58] Field of Search .................. 192/18 B, 84 AA, 90, 192/48.2, 113 A, 14; 310/76

[56] References Cited

U.S. PATENT DOCUMENTS

| | | | |
|---|---|---|---|
| 1,155,124 | 9/1915 | Berger | 192/18 B |
| 1,866,675 | 7/1932 | Sarazin | 192/84 AA X |
| 1,899,829 | 2/1933 | Sarazin | 192/84 AA X |
| 2,292,704 | 8/1942 | Lillquist | 192/90 X |
| 2,455,900 | 12/1948 | Yardeny et al. | 192/14 |
| 2,729,310 | 1/1956 | Le Tourneau | 192/90 X |
| 3,160,128 | 12/1964 | Heidt | 192/18 B X |
| 3,223,212 | 12/1965 | Shepard | 192/18 B |
| 3,463,027 | 8/1969 | Gelb | 192/18 B X |
| 3,487,438 | 12/1969 | Becker et al. | 192/48.2 X |
| 3,581,855 | 6/1971 | Taeffner et al. | 192/18 B |
| 3,777,864 | 12/1973 | Marti | 192/113 A X |
| 3,945,476 | 3/1976 | de Jong | 192/18 B X |
| 3,978,948 | 9/1976 | Baer | 192/18 B |
| 3,989,129 | 11/1976 | Brandenstein | 192/52 X |
| 4,172,985 | 10/1979 | Meier | 192/18 B X |
| 4,228,385 | 10/1980 | Angersbach et al. | 318/614 |
| 4,505,366 | 3/1985 | Sangiorgi | 192/18 B |

FOREIGN PATENT DOCUMENTS

| | | | |
|---|---|---|---|
| 687645 | 2/1940 | Fed. Rep. of Germany | 310/76 |
| 920422 | 11/1954 | Fed. Rep. of Germany | 192/18 B |
| 1265843 | 4/1968 | Fed. Rep. of Germany | . |
| 1488083 | 10/1972 | Fed. Rep. of Germany | . |
| 2263259 | 11/1980 | Fed. Rep. of Germany | . |
| 1427250 | 12/1965 | France | . |
| 2211789 | 7/1974 | France | . |

*Primary Examiner*—Rodney H. Bonck
*Attorney, Agent, or Firm*—Karl F. Ross; Herbert Dubno

[57] ABSTRACT

A variable speed drive has an asynchronous motor whose output shaft carries a flywheel which is juxtaposed axially with a ferromagnetic disc movable on a spline of an output shaft journaled in a common housing for the flywheel, the disc and at least one electromagnetic coil surrounding the output shaft, located within the parameter of the disc and energizable to control the relative engagement of the disc with a brake ring on the housing and a clutch ring on the flywheel. Vanes on opposite sides of the flywheel induce air to flow axially into the housing through the disc and radially out of the housing for cooling.

5 Claims, 4 Drawing Figures

ELECTROMECHANICAL DRIVING SYSTEM WITH VARIABLE SPEED

FIELD OF THE INVENTION

The invention relates to an electromechanical driving system having an asynchronous motor and which is capable of continuous speed variation using electromagnetic friction couplings.

BACKGROUND OF THE INVENTION

Driving systems with asynchronous motors and adjustable speed by variation of the supplying voltage frequency are known. These systems have the disadvantage that the speed varying device is expensive.

It is also know to provide driving systems which employ direct-current motors which have collectors and brushes and which are driven with a high operating frequency, but which have the disadvantage that they are less reliable.

Driving systems with asynchronous motors and speed variation brought about through couplings are not able to provide rapid dynamic behavior.

OBJECTS OF THE INVENTION

It is the object of the invention to provide an improved drive using an asynchronous motor.

SUMMARY OF THE INVENTION

This invention removes the above mentioned disadvantages by providing a self-ventilated flywheel in the friction zone, mounted on the shaft of a mass-produced asynchronous motor, and a ferromagnetic disc with ventilation slits which slides along grooves of the output shaft of the machine. On the disc are mounted on one side a ring of friction material with the purpose to take over the rotary motion of the flywheel and on the other side a second ring of friction material for braking and an electromechanical coupling and disc braking device.

SPECIFIC DESCRIPTION

Figure 1:
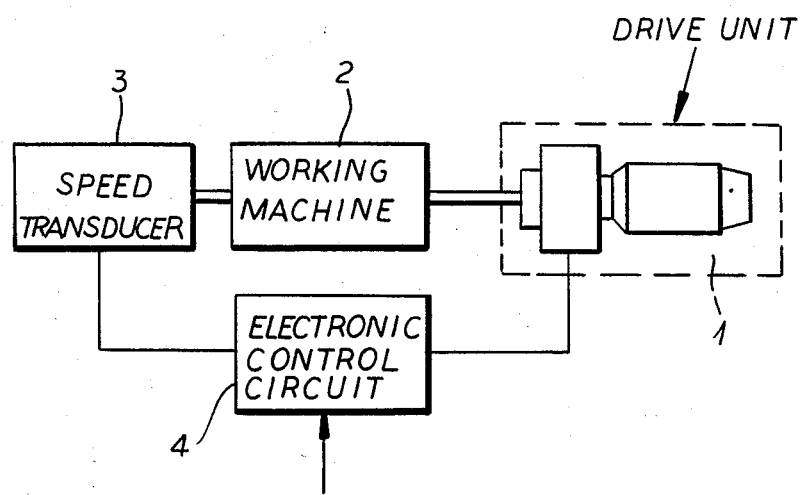
FIG. 1 is a block diagram of an electromechanical driving system with variable speed and electronic control, which drives a load.
Figure 2:
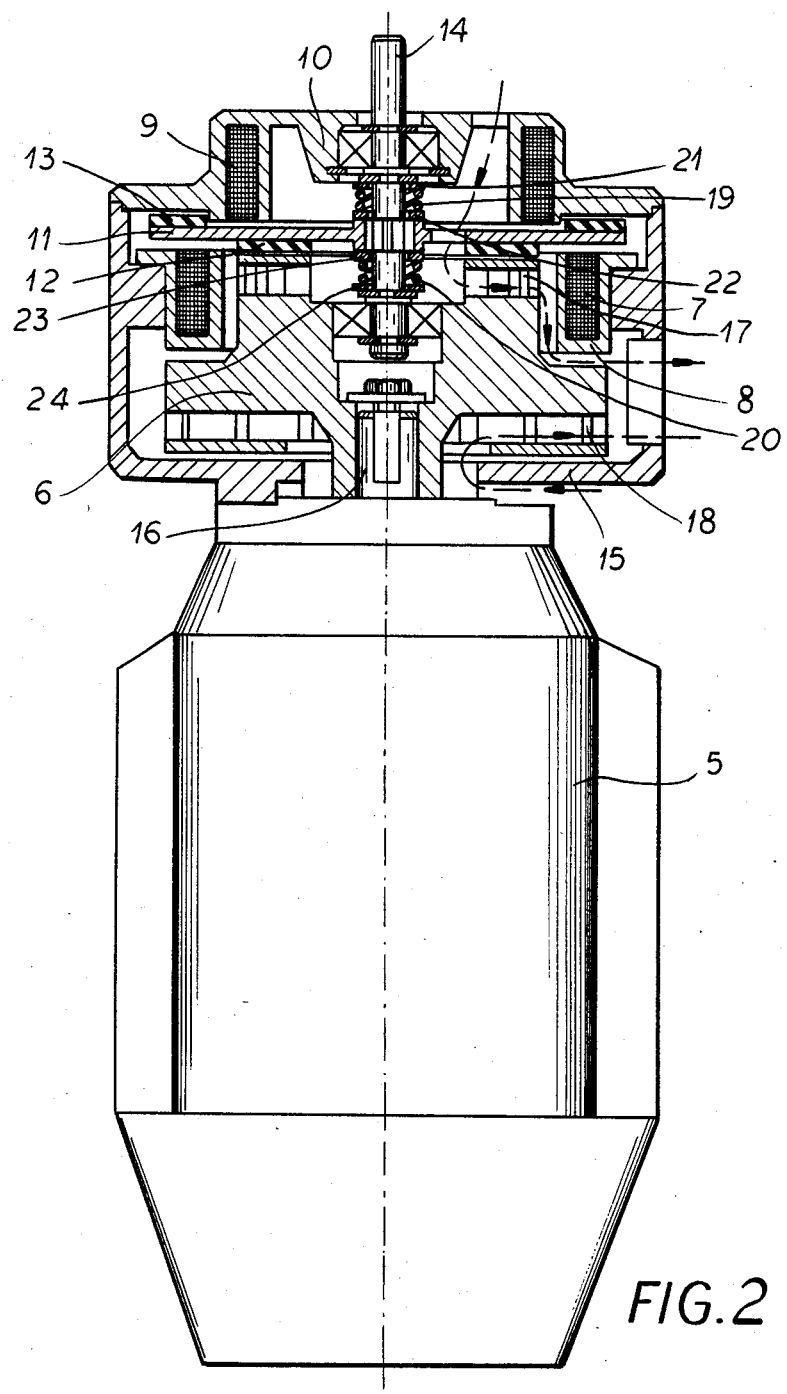
FIG. 2 is an axial section of an electromechanical driving system of the invention with two electromagnets.

Under the invention, the electromechanical driving system with variable speed and electronic control of FIG. 1 which allows continuous speed adjustment comprises a driving unit 1 whose output shaft is connected to a working machine 2, to whose shaft is fixed a speed transducer 3 connected to an electronic control circuit 4, all these operating in a speed adjustment ring. The drive unit 1 is represented by a mass produced shunt rotor asynchronous motor 5 and an assembly of couplings including a flywheel 6 whose inertia is computed to correspond to the load shock at the moment of coupling and to the dynamic force generated by the electronic control circuit 4, an electromagnet for coupling formed by a coil in the case 8 and an electromagnet 9 for braking formed by a coil on a shield 10; between the two electromagnets 7 and 9 is a ferromagnetic disc 11 with ventilation slits. The opposite surfaces of the disc carries two rings of friction material 12 and 13. The friction ring mounted on the side of the flywheel 6 of a disc 11 takes up the flywheel rotary motion.

The friction ring 13 on the other side of the disc brakes the disc by friction on the shield 10.

Depending on the kind of the control, the disc 11 shifts along grooves or splines in a driven shaft 14, either towards the flywheel 6 accomplishing the coupling function, or toward the shield 10 accomplishing the braking function to maintain the speed selected using the feedback loop of FIG. 1. The couplings ensemble is mounted in a case 15, through which it is attached on a flange of a motor 5.

According to the invention, the clutch assembly of this unit 1, is self-ventilated by a ventilation system independent of the ventilation system of the motor 5, the two directions of the cooling agent being noted with the dotted line.

The flywheel is self-ventilated by two fans 17 and 18 incorporated in the flywheel, the fan 17 being located in the friction zone together with the friction ring 12 from the disc 11.

In the first embodiment of the invention, the assembly of the electromagnetic friction couplings is formed of a single ferromagnetic disc independently actuated at coupling by the electromagnet 7 and at braking by electromagnet 9. The disc 11 on which is applied on one side the ring of friction material 12, and on the other side the ring of friction material 13, slides axially on the splines of the driven shaft 14, held in a resting position by means of two opposing springs 19 and 20 and two sets of washers 21, 22, 23 and 24.

The coupling and braking electromagnets and the springs and washers form together an electromechanical device for coupling and braking of the disc.

Figure 3:
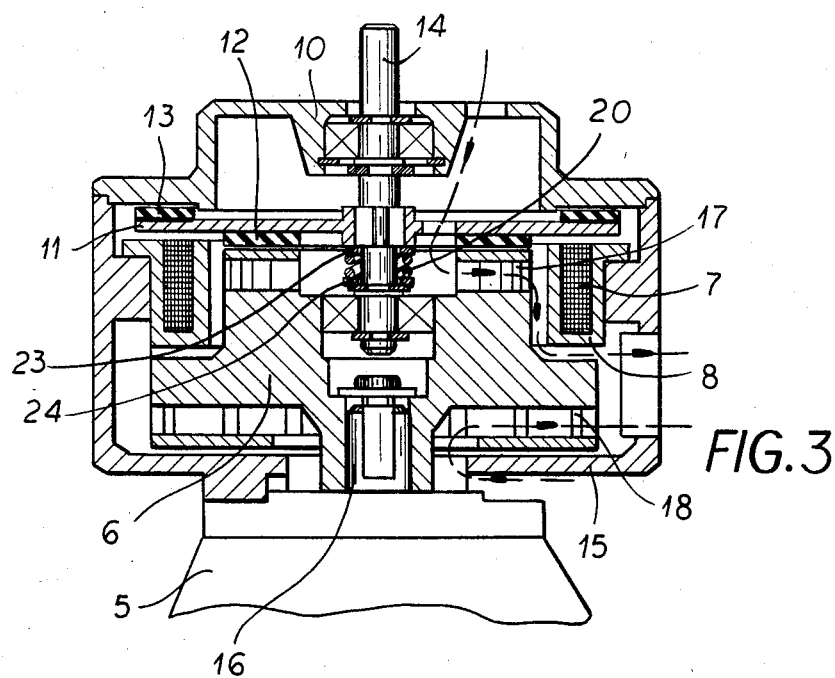
FIG. 3 is a similar section of an electromechanical driving system with coupling electromagnet.

In the second embodiment of the invention seen in FIG. 3 the electromechanical device for disc coupling and braking is formed by the spring 20 with two washers 23 and 24 and the clutch electromagnet 7 suitably sized.

The coupling electromagnet 7 is supplied with a residual voltage for maintaining the resting position of the disc 11.

To accomplish the braking function, the electromagnet 7 is entirely turned off and the braking force is produced by the spring 20 which is suitably sized for this purpose to push the disc with the friction ring 13 against the shield 10.

To accomplish the coupling function, the voltage applied to the electromagnet 7 is increased over the value of the residual voltage. The greater the ratio between the applied voltage and the residual voltage, the shorter is the coupling time.

In all three embodiments the self-ventilation is accomplished by the drawing of cooling air by the fan 17, through inlets in the shield 10, close to electromagnet 9, through slits in the disc 11, and driving the air past the electromagnet 7 through inlets in the case 15. The air drawn through the inlets of the case 15 is driven by the fan 18 connected to the motor shaft.

Figure 4:
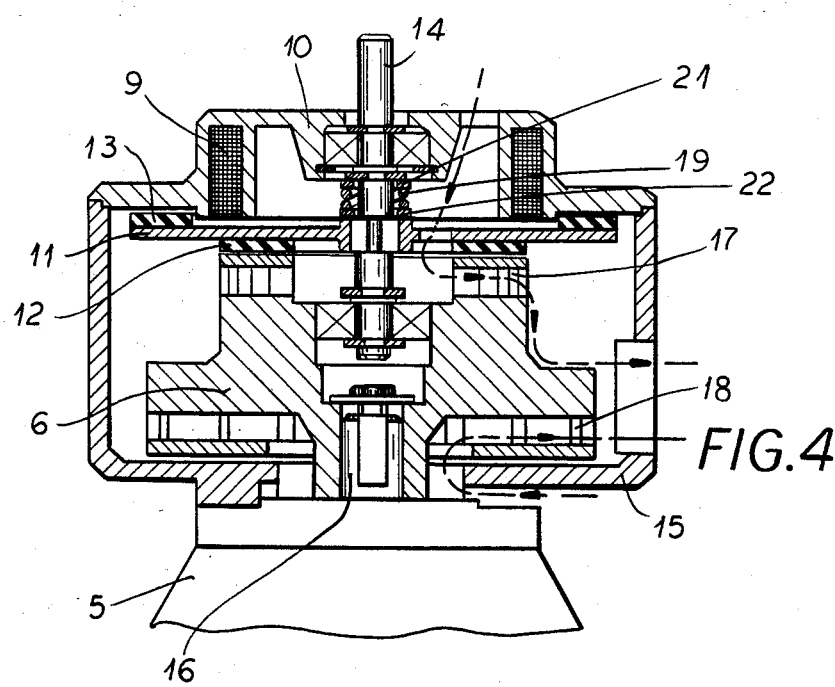
FIG. 4 is another axial section of an electromechanical driving system with a braking electromagnet.

In the third embodiment of this invention, in connection with FIG. 4, the electromechanical device for coupling and braking uses the spring 19 with the washers 21 and 22 and braking electromagnet 9.

The braking electromagnet is supplied with a residual voltage to obtain the resting position of the disc 11.

In order to accomplish the coupling function, the voltage applied to the electromagnet 9 under the value of the residual voltage is reduced, thus the coupling with the flywheel 6 is permitted, the coupling force being brought about by the spring 19. Depending on the applied voltage, the driven shaft 14 attains a certain speed value, so that when the voltage is entirely turned on it rotates at the same speed as the shaft of the asynchronous motor 5.

The braking function is accomplished by the increase of the applied voltage value over the value of the residual voltage. The greater the ratio between the applied voltage and the residual voltage, the shorter the braking time.

The invention involves the following advantages:

it uses a mass produced asynchronous motor which by comparison with any other type of electric motor is inexpensive and reliable;

it provides rapid dynamic behavior; and during the operation, the system does not require adjustments.

We claim:

1. A variable speed drive comprising:

an asynchronous motor having a motor shaft extending from one end of said motor;

a housing disposed at said end of said motor and enclosing said motor shaft;

a flywheel in said housing mounted on said motor shaft and formed with an annular surface facing axially away from said motor;

an output shaft journaled in said housing coaxially with said motor shaft and having an end extending from said housing for connection to a load, said output shaft having a splined portion disposed in said housing;

a ferromagnetic disc rotatably entrained with said output shaft in said housing and axially shiftable on said splined portion, said disc being formed on a side confronting said surface with a first ring of friction material and being provided on its opposite side with a second ring of friction material juxtaposed with an annular surface of said housing surrounding said output shaft;

an electromagnetic coil mounted on said housing coaxial with said output shaft within the circumference of said disc and axially juxtaposed therewith whereby energization of said coil attracts said disc in one axial direction so that one of said rings engages a respective one of said surfaces; and means in said housing for displacing said disc in an opposite axial direction whereby the other of said rings engages the other of said surfaces and the relative engagements of said rings with the respective surfaces as controlled at least in part by the duration of energization of said electromagnetic coil determines the speed of said output shaft, wherein said flywheel is formed proximal to its said surface juxtaposed with said first ring with an array of vanes inducing a flow of cool air axially into said housing through an opening provided outwardly of said output shaft, said disc being provided with at least one opening traversed by the cooling air induced into said housing by said vanes, said vanes directing said flow of air along an inner periphery of said electromagnetic coil and radially outwardly through at least one opening formed in a peripheral wall of said housing.

2. The drive defined in claim 1 wherein said electromagnetic coil coaxially surrounds at least a portion of said flywheel provided with said vanes.

3. The variable speed drive defined in claim 2 wherein said means for displacing said disc in said opposite axial direction includes a spring received in said flywheel, surrounding said output shaft and bearing upon said disc.

4. The drive defined in claim 2 wherein said means for displacing said disc in said opposite axial direction includes a second electromagnetic coil received in said housing coaxial with said output shaft and axially juxtaposed with said disc inwardly of said second ring.

5. The drive defined in claim 1 wherein said flywheel is provided with a further set of vanes inducing a flow of cool air inwardly into said housing between said housing and said motor and displacing air radially outwardly through said opening in said peripheral wall.

* * * * *